United States Patent

Combs

[11] Patent Number: 6,138,129
[45] Date of Patent: Oct. 24, 2000

[54] METHOD AND APPARATUS FOR PROVIDING AUTOMATED SEARCHING AND LINKING OF ELECTRONIC DOCUMENTS

[75] Inventor: J. Andrew Combs, Hayward, Calif.

[73] Assignee: World One Telecom, Ltd., Alameda, Calif.

[21] Appl. No.: 08/991,451

[22] Filed: Dec. 16, 1997

[51] Int. Cl.$^7$ .............................. G06F 17/30; G06F 17/00
[52] U.S. Cl. ................................. 707/501; 707/3
[58] Field of Search ..................................... 707/501, 500, 707/513, 1–7, 100–102, 515, 529, 104, 10

[56] References Cited

U.S. PATENT DOCUMENTS

| | | | |
|---|---|---|---|
| 5,655,130 | 8/1997 | Dodge et al. | 395/772 |
| 5,778,372 | 7/1998 | Cordell et al. | 707/100 |
| 5,832,474 | 11/1998 | Lopresti et al. | 707/2 |

*Primary Examiner*—Joseph H. Feild
*Assistant Examiner*—Alford W. Kindred
*Attorney, Agent, or Firm*—Blakely, Sokoloff, Taylor & Zafman, LLP

[57] ABSTRACT

A method and apparatus for a relatively meaningful search and/or link operation to be performed within and/or between one or more electronic documents. According to one aspect of the invention, a method and apparatus is provided for extracting and storing text, image and/or location information of an electronic document. According to another aspect of the invention, a tag may be specified as label for a set of search and/or link (e.g., source and target) parameters, each having a set of "rules" associated therewith, for searching the stored text, image, and/or location information. According to yet another aspect of the invention, the set of parameters may include context (e.g., specified character/text patterns that may occur within and/or adjacent to one or more specified patterns) and/or location (e.g., a page number/range, a box on a page, a filename, tag, character/line offset, etc.) information/rules.

6 Claims, 2 Drawing Sheets

METHOD AND APPARATUS FOR PROVIDING AUTOMATED SEARCHING AND LINKING OF ELECTRONIC DOCUMENTS

BACKGROUND OF THE INVENTION

1. Field of the invention

The invention relates to the field of processing electronic documents (e.g., data files). More specifically, the invention relates to the field of searching and optionally linking objects of electronic documents (e.g., to create hyperlinks in HTML cast Web documents, an electronic manual, etc.).

2. Background Information

In some applications, it may be useful to provide links within and/or between documents. For example, in the field of computer networking, "hyperlink navigation" (HLN) may be utilized to establish links within and/or between hypertext electronic documents, such as "Web pages." The links are typically established by creating "hot spots" that, when activated (e.g., with the click of a computer mouse), link a source and a target within and/or between one or more electronic documents (e.g., one or more Web pages, electronic books/manuals, etc.).

One limitation of HLN is the relatively substantial manual labor that is typically involved in creating links, especially in legacy documents. In general, the following steps may be required to create links: (1) scanning one or more documents (which may be paper, microfiche, etc.) using optical character recognition (OCR) to create an electronic file(s) of the one or more documents; (2) editing/formatting the OCR documents; (3) converting the scanned electronic text/image file(s) into a desired format, such as Hypertext Markup Language (HTML); and (4) searching the formatted file(s) to determine sources and targets to create desired links (e.g., hyperlinks) within and/or between the one or more electronic documents. When using certain formats, such as HTML, the errors in the OCR process should be eliminated. However, eliminating such errors may often pose a relatively substantial source of time/labor investment.

For relatively large documents, manual searching, such as for a source and/or a target of a desired link, may be impractical and/or time-consuming. One search technique that may be performed to provide limited search efficiency in an electronic document is character searching. As an example, word processing applications typically provide a character search feature, which allows a user to search a data file (e.g., a text file) for a specified set of characters, such as a word or phrase. When a character search is performed and a match for the specified set of characters (sometimes referred to as a "target" or "hit" pattern) is detected, a "hit" occurs. As a result of a hit, a user may be provided with an indication of the hit (e.g., the set of characters in the document that match the specified set of characters of the search may be highlighted on a display).

Unfortunately, character search techniques may not be useful in some applications, such as link creation within and/or between electronic documents. One reason is that although two sets of characters may be identical (resulting in a search "hit"), the set of characters may have different meanings, thereby resulting in an undesirable match or "hit." In other instances, two literally different sets of characters may have the same meaning (e.g., "page 8, section 2" and "section II, p. 8" and "2-8"), but would fail to be detected as a hit. As a result, past search techniques may fail to detect desired matches, or they may detect invalid matches.

Thus, utilizing past search techniques, a relatively extensive amount of manual search and/or editing may be still be performed to search and/or establish desired links within and/or between one or more electronic documents.

SUMMARY OF THE INVENTION

The present invention provides a method and apparatus for a relatively meaningful search and/or link operation to be performed within and/or between one or more electronic documents. According to one aspect of the invention, a method and apparatus is provided for extracting and storing text and corresponding location/context information. According to another aspect of the invention, a tag may be specified as label for a set of search and/or link (e.g., source and target) parameters, each having a set of "rules" associated therewith, for searching the stored text and corresponding location/context location. According to yet another aspect of the invention, the set of parameters may include context (e.g., specified character/text patterns that may occur within and/or relative to one or more specified patterns) and/or location (e.g., a page number/range, a box on a page, a filename, tag, character/line offset, etc.) information/rules.

DETAILED DESCRIPTION

The present invention provides a method and apparatus that allows a relatively flexible, meaningful search and/or link operation to be performed within and/or between one or more documents, by allowing character pattern, context, and/or location "rules" to be specified for a search or link operation. In the following description, numerous specific details are set forth to provide a thorough understanding of the invention. However, it is understood that the invention may be practiced without these specific details. In other instances, well-known circuits, structures and techniques have not been shown in detail to avoid obscuring the invention.

Figure 1:
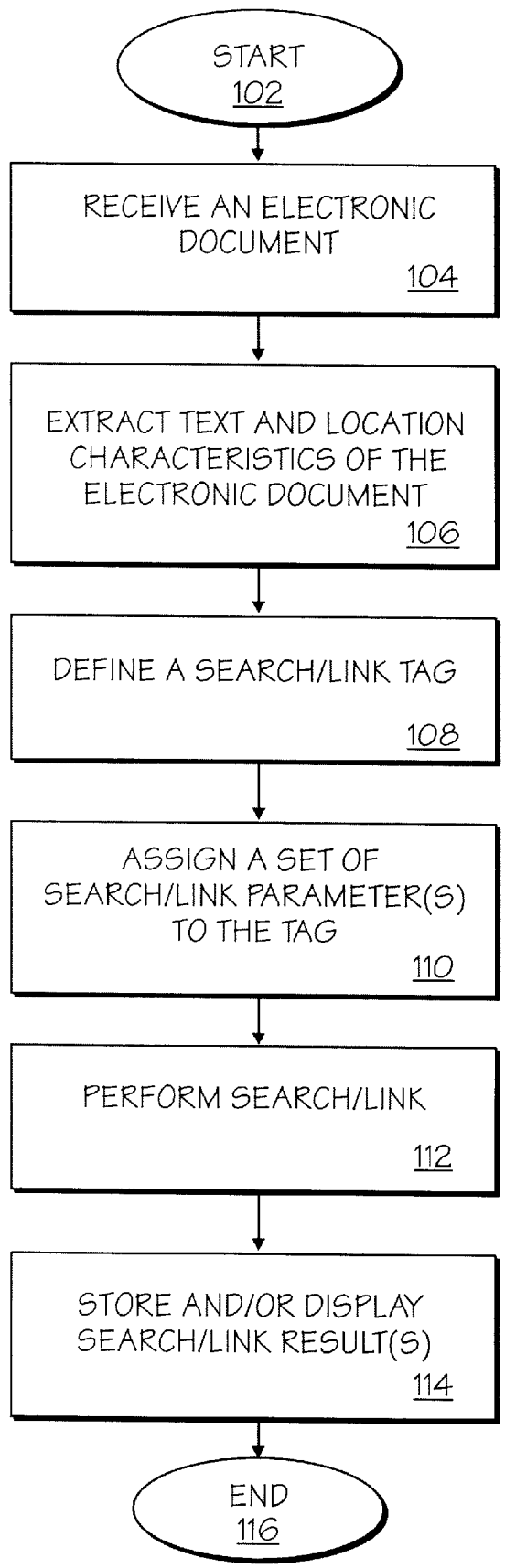
FIG. 1 is a flow diagram illustrating a method for performing search and/or link operations according to one embodiment of the invention.

FIG. 1 is a flow diagram illustrating a method for performing electronic document search and/or link operations according to one embodiment of the invention. It should be understood that the flow diagrams provided herein are meant to provide understanding of an embodiment of the invention. As such, alternative ordering of the steps, performing one or more steps in parallel, and/or performing additional or fewer steps may be done in alternative embodiments of the invention.

In FIG. 1, flow begins at step 102, and passes to step 104. In step 104, an electronic document is received, and flow passes to step 106. For example, the electronic document may be the result of scanning a paper, microfilm, etc., and casting the scanned document into a desired electronic format, such as HTML. In alternative embodiments, the electronic document may not be scanned and/or one or more of several types of formats may be utilized (e.g., raster, standard generalized markup language (SGML), a text file, etc.).

In step 106, text and location characteristics of the electronic document are extracted and stored, and flow passes to step 108. The text and location characteristics are stored in a pattern dictionary data structure, referred to as a "lexicon."

The lexicon is a data structure that correlates character/image information (e.g., character patterns specified by ASCII codes) of the electronic document(s) with a relative location or displacement (e.g., particular file, page, line, box, tag, character offset, etc.) where the character/image information occurs within the document. For example, if an HTML document is received in step 104, text content of the document may be correlated, in the lexicon, to location tags or character offsets. In other formats (e.g., raster), other location-text delimiters may be utilized, such as line number, page number, etc. Thus, for each format may correspond appropriate location parameters. Typically, a document has a file name. Raster documents, for example, typically have a page number, and text in raster format has a box location (x and y, width and height in pixels). On the other hand, SGML typically has both character offsets and tag instance, and text processor formats typically have a combination of some or all of the above-mentioned associated location parameters.

In one embodiment, the lexicon is indexed. In another embodiment, the lexicon is not indexed. In general, the lexicon may take a number of different formats in alternative embodiments of the invention. For example, depending on the amount of data to be processed, the lexicon may be indexed. Alternatively, the lexicon may be contained in a flat file. In one embodiment, the lexicon is contained in a relational database engine. Although the lexicon may be generated in any one of the above-mentioned or other formats, the lexicon should indicate the relation between character pattern and location.

As an example, in one embodiment of the invention, a raster document may be scanned and passed through optical character recognition (OCR) to obtain character pattern(s) and respective location(s). The character pattern(s) may constitute the extracted text, and the location may be defined as the filename, page, and box surrounding the character pattern(s). In one embodiment, for example, the lexicon is implemented to include a single line of characters (e.g., text, spaces, etc.) with delimiters to separate location and character pattern items. As such, multiple instances of the relation between character patterns and pattern locations may constitute many lines, together forming the lexicon as a "table", wherein columns of the table may include filename, page number, text pattern, box coordinates, and/or other location information or tags.

In step 108, a search and/or link tag, or simply, tag, is defined, and flow passes to step 110. In one embodiment, the tag serves as a label for a set of parameters and associated set of "rules" that are used to perform a search and/or link operation with the electronic document and/or between one or more electronic documents. The set of parameters and associated rules, as described in further detail below, may provide "meaning" beyond literal character patterns to the specified tag(s).

To provide an understanding of the invention according to one embodiment, consider an example wherein a particular section and page—for instance, section 9, page 5—in the table of contents of a document (the link source, or source) is to be linked with a corresponding section-page header(s) in the body of the document (the link target, or target). For example, a tag such as "SECTION_PAGE" may be specified, for example, in a graphical user interface (GUI) that provides one or more features of the present invention. It should be appreciated that a tag serves as a label, that may be specified by a user, for a set of search and/or link parameters and associated rules.

In step 110, a set of one or more search/link hit parameters, or simply, search parameters, may be defined for the tag, and flow passes to step 112. In one embodiment, the set of search parameters may include context, location, and/or display attributes. Context may include, for example, a set of one or more character pattern rules defining character patterns that may occur within, before, and/or after a desired character "hit" pattern (i.e., character pattern within a hit) in the electronic document.

Referring back to the example provided above, wherein the tag "SECTION_PAGE" is specified in step 108, a source "rule" for the link may employ two link context patterns: a first link pattern being defined for the section number, and second link pattern being defined for a page number. Thus, a set of context, and in particular, character hit pattern rules for the source of the desired link(s) may be defined as "Section <1?[,] Page <2>", "Page <2> in Section <1>", "<2>–<1>", where <I1> and <I2> specify the first and second link context patterns, respectively. Thus, context, and in particular, character hit pattern rules, when applied to the lexicon will find "hits" (for search or link operations) for all the literally distinct patterns such as "Section 9 Page 5", "Section IX, page 5", "9-5", etc., when the section number is 9 and the page number is 5, for example.

In one embodiment, rules for multiple variables are defined in a set of rules, wherein the number of variables is constant. For example, the tag SECTION_PAGE mentioned in the example above, may have a set of two variable rules, where variable <1>always represents the section number, and variable <2>always represents the page number. Thus, rules that may constitute a SECTION_PAGE tag may include:

Section <1>, Page <2>

<1>–<2> pg. <2> of section <1> and so on. For <1>equal to 9 and <2> equal to 5, the instances of character hit patterns could include 9-5

Section 9, Page 5 pg. 5 of section 9

In one embodiment of the invention, the "_<1>_<2>" are appended to the SECTION_PAGE tag. Thus, although literally distinct, the above character hit patterns could be obtained by the above specified rules and cast to a semantically unique search tag, such as SECTION_PAGE_9_5. In one embodiment of the invention, a set of tags, resulting from a transformation of realized search hits, may form a single semantic entity, whose pattern literally matches all other instances of SECTION_PAGE_9_5, regardless of the actual occurrence order of the original character pattern (i.e., variable) components.

While context may include character hit patterns, as described above, a set of search parameter rules may also include a set of rules for character patterns that may be specified by location. For example, a set of one or more location rules may be specified to obtain hits, for example, at the beginning and/or end of a line, top, bottom, other part of a page, before and/or after a particular character/character pattern (e.g., a space, beginning after/before a particular capital letter, a number, a symbol, other character(s), etc.) It should be appreciated that context/location rules may also be specified to omit certain patterns from resulting in a hit (e.g., if it is expected that a desired hit will be aligned in the center of a page, context rules may be defined to omit any text that is left-aligned, for example).

As mentioned above, location rules may be defined to specify a page number/range, a box on a page, a filename, a tag, character/line offset, etc., for a character hit pattern or other context rule(s). As such, location may depend on the format of the electronic document (e.g., lines may be specified for raster documents, tags/character offsets for HTML documents, etc.). Again referring to the example of the "SECTION_PAGE" search provided above, a target location rule may specify the top of a page, which may be expected, in the example above, to contain the header character pattern "9-5". It should be appreciated that a location rule may be specified to omit certain locations from resulting in a hit (e.g., a rule may be specified such that a hit does not occur for the character pattern "9-5" if it occurs at the bottom of a page or some other location).

In one embodiment, source rules are applied to the lexicon. Thus, the source rules "filter out" any pattern whose location is not satisfied by the rules. The rules may also filter out any pattern which does not match context and link patterns defined in the rule. Thus, what remains following the "filtering" provided by the specified set of context and/or location rules are considered hits, and in one embodiment, are cast into the form "tag_<1>_<2>_... <n>", where <n> is the nth link pattern (i.e., hit variable) of the rule set. In one embodiment of the invention, what is obtained is source hits as tags followed by the actual pattern and box data. The source hits may be used for searching and/or to generate links with targets.

In one embodiment of the invention, to generate links between sources and targets, target hits may be treated similarly to source hits, as described above with reference to one embodiment of the invention. Thus, target hits may generate tag hits. The source and target outputs are then matched up to find valid links, i.e., where the source tag and target tag match exactly. In one embodiment of the invention, the mechanism for matching and filtering may be done via relational database language against a lexicon stored in a relational database. In another embodiment, a relatively simple, yet rapid approach is implemented by using a flat file lexicon, where rules are defined as regular expressions and file centric tools such "sort", "grep", "awk" and "sed" may be applied against the lexicon.

In one embodiment, a search/link hit display attribute may also be specified at step 110. For example, a display attribute may be selected that corresponds to one or more colors for highlighting and displaying source and/or target hits of a link operation. In one embodiment, underlining of search and/or link hits may be selected as a display attribute. In alternative embodiments, other display attributes may be selected, or a display attribute may not be provided/selected.

In step 112, the search and/or link operation is performed according to the specified set of parameters and associated rules, and flow passes to step 114.

In step 114, the search and/or link result(s) are displayed, and flow passes to step 116, wherein flow ends. In one embodiment, search and/or link results obtained based on the set of parameters specified in step 110 are displayed. In one embodiment, the source(s) and target(s) of a link operation may be displayed utilizing an attribute, which may be selected in step 110. For example, link sources may be displayed as HLN-type hotspots in one color (e.g., red, yellow, etc.), while link targets may displayed in the same or a different color.

In one embodiment, the invention is implemented in a graphical user interface, wherein graphical "commands" enable a user to specify search/link tags, a set of search parameters and associated rules for one or more tags, search/link hit display attributes, etc. In one embodiment, only search operations are performed. In another embodiment, search and/or link operations may be performed.

By allowing specification of a tag, and a corresponding set of search and/or link parameters, such as context and/or location, which provide meaning beyond literal character matches to a desired tag, the invention provides a method and apparatus for intelligent, automated search and/or link within and/or between one or more electronic documents.

Figure 2:
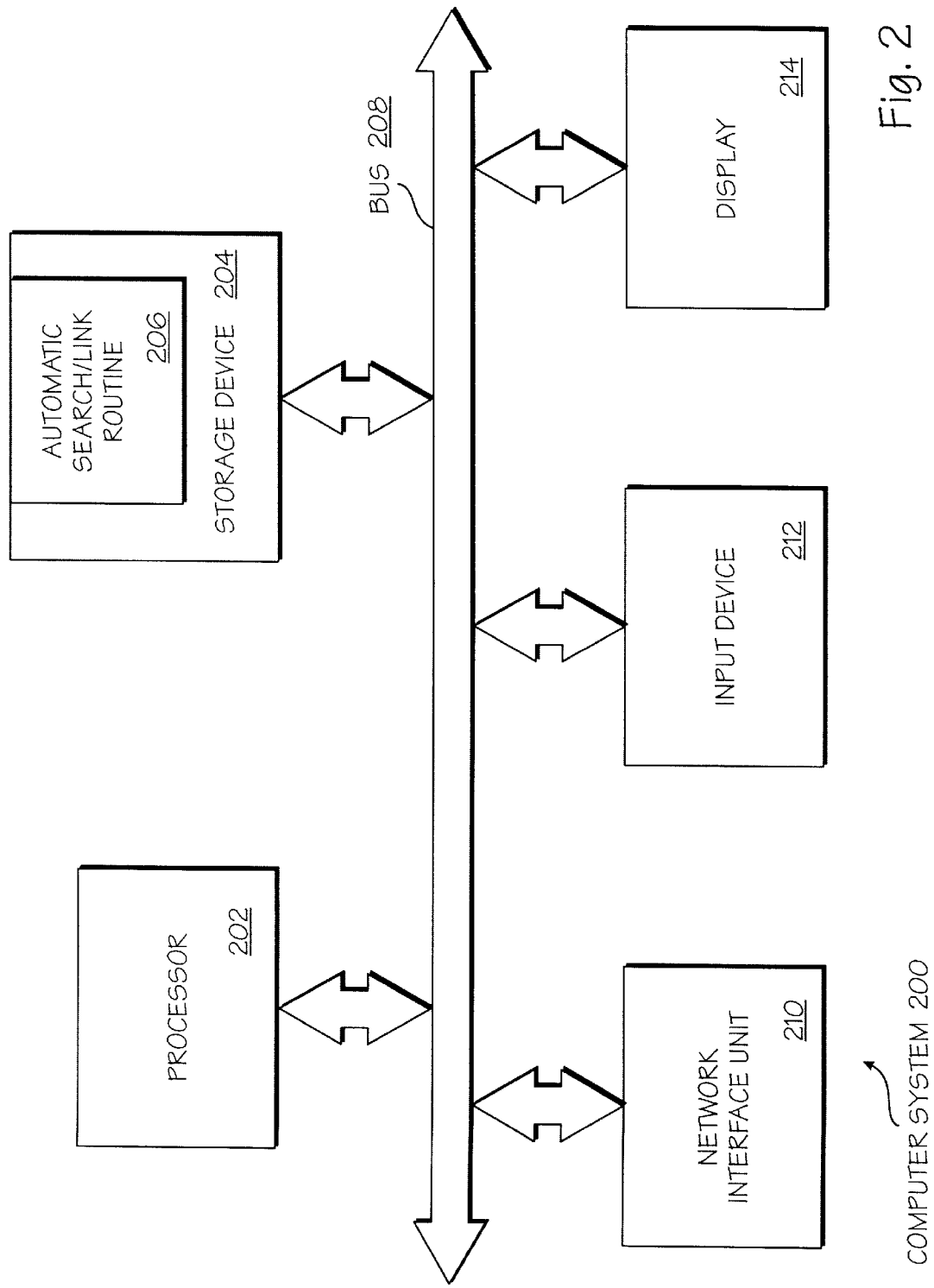
FIG. 2 is a block diagram of a computer system operable to perform electronic document search and/or link operations according to one embodiment of the invention.

Referring now to FIG. 2, a block diagram of a computer system operable to perform electronic document search and/or link operations according to one embodiment of the invention is shown. Shown in FIG. 2 is an exemplary computer system 200, which includes a bus 208 that couples a processor 202, a storage device 204, a network interface 210, an input device 212, and a display 214.

The storage device 204 may be implemented using a one or more of several known types and/or combinations of devices that provide data storage (e.g., random access memory (RAM), read-only memory (ROM), magnetic machine-readable medium, optical machine-readable medium, DRAM, SRAM, etc.).

As shown, the storage device 204 stores an automatic search/link routine 206, which, when executed by the processor 202 (and/or additional devices which may be coupled to the bus 208), may allow one or more of the functions described with reference to FIG. 1 to be performed. In one embodiment, the automatic search/link routine 206 is configured to allow: (1) establishment of a lexicon that includes character/text pattern and location information for one or more documents; (2) specification of a search and/or link tag; (3) specification of a set of one or more search and/or link parameters (e.g., context, location, etc.) and a set of rules associated with each or combination of the set of parameters; and (4) execution of an automated search and/or link operation based on the set of parameters.

The display 214 may provide, in one embodiment, a display of search results, automatically generated links (e.g., by highlighting sources and/or links), documents, graphical commands, windows for specifying search/link tags, search/link parameters, rules, etc. The input device 212, which may implemented by several combinations and/or types of input devices (e.g. a keyboard, mouse, trackball, etc.) may allow a user to specify search objects, search parameters, and/or enter other commands to control various functions of the system 200. In one embodiment of the invention, the automatic search/link routine 206 is operable to provide graphical user interface (GUI) functionality and display on the display 214.

In one embodiment, the system 200, in response to the automatic search/link routine 206, may be operable to automatically generate links within and/or between one or more documents received from and/or transmitted to a network of computer systems (e.g., an intranet, the Internet, a LAN, etc.) via the network interface unit 210. As such, the links may be created within and/or between one or more HTML documents (e.g., Web pages), for example. Alternatively, the automatic search/link routine 206 may be utilized to search within a document, create links within a document (e.g., between table of content entries in an "electronic book/manual" and corresponding sections with the document), etc. Once source and target hits are detected within and/or between selected documents, based on the specified set of search/link parameters (e.g., context, location, etc.) corresponding to a user defined search/link tag, the hits may be automatically generated as links within and/or between the selected documents.

ALTERNATIVE EMBODIMENTS

While the invention has been described in terms of several embodiments, those skilled in the art will recognize that the invention is not limited to the embodiments described. Therefore, it should be understood that the method and apparatus of the invention can be practiced with modification and alteration within the spirit and scope of the appended claims and equivalents thereof. The description is thus to be regarded as illustrative instead of limiting on the invention.

What is claimed is:

1. In a computer system, a method for performing a search of a set of electronic documents comprising:

accessing data that correlates a plurality of character patterns in the set of electronic documents with relative displacement of the plurality of character patterns in the document;

defining a tag to search the set of electronic documents;

defining a set of one or more context rules to be associated with the tag, the set of context rules to specify relative displacement of a subset of the plurality of character patterns in the set of electronic documents; searching the set of electronic documents based on the set of context rules;

upon searching the document, creating a link based on the context and the relative displacement of the predetermined pattern; and displaying the link as a hotspot.

2. The method of claim 1, wherein the relative displacement includes the location of first set of one or more characters relative to a second set of one or more characters.

3. A computer-readable medium having stored thereon a set of instructions, the set of instructions for searching an electronic document, the set of instructions, which, when executed by a processor, causes the processor to perform the steps of:

accessing data that correlates a plurality of character patterns in the set of electronic document with relative displacement of the plurality of character patterns in the electronic document;

defining a tag to search the electronic document;

defining a set of one or more context rules to be associated with the tag "defining a predetermined pattern", the set of context rules to specify relative displacement of a subset of the plurality of character patterns in the electronic document;

searching the electronic document based on the set of context rules upon searching the document, creating a link based on the context and the relative displacement of the predetermined pattern; and displaying the link as a hotspot.

4. The computer-readable medium of claim 3, wherein execution of the set of instructions further causes the processor to perform the steps of:

obtaining a set of search hits, based on searching the electronic document; and creating a link between the set of search hits.

5. The computer-readable medium of claim 4, wherein the link is created between the electronic document and another electronic document.

6. The computer-readable medium of claim 4, wherein the set of context rules further specifies a character pattern to define the tag.

* * * * *